US009452730B2

(12) United States Patent
Fujiwara

(10) Patent No.: US 9,452,730 B2
(45) Date of Patent: Sep. 27, 2016

(54) VEHICLE FAR SIDE AIRBAG DEVICE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/857,487

(22) Filed: Sep. 17, 2015

(65) Prior Publication Data

US 2016/0101760 A1 Apr. 14, 2016

(30) Foreign Application Priority Data

Oct. 10, 2014 (JP) ................. 2014-209107

(51) Int. Cl.
| | |
|---|---|
| B60R 21/261 | (2011.01) |
| B60R 21/2334 | (2011.01) |
| B60R 21/207 | (2006.01) |
| B60R 21/2165 | (2011.01) |
| B60R 21/231 | (2011.01) |
| B60R 21/268 | (2011.01) |

(52) U.S. Cl.
CPC ........... *B60R 21/261* (2013.01); *B60R 21/207* (2013.01); *B60R 21/2165* (2013.01); *B60R 21/2334* (2013.01); *B60R 21/23138* (2013.01); *B60R 21/268* (2013.01); *B60R 2021/23146* (2013.01)

(58) Field of Classification Search
CPC .......... B60R 21/261; B60R 21/23138; B60R 21/2165; B60R 21/268; B60R 21/2334; B60R 21/207; B60R 2021/23146
USPC ................. 280/730.2, 743.1, 743.2
See application file for complete search history.

(56) References Cited

U.S. PATENT DOCUMENTS

| | | | |
|---|---|---|---|
| 6,074,003 A | 6/2000 | Umezawa et al. | |
| 7,240,915 B2* | 7/2007 | Peng | ................... B60R 21/2338 280/730.2 |
| 7,549,672 B2 | 6/2009 | Sato et al. | |
| 8,448,981 B2* | 5/2013 | Fukawatase | .......... B60R 21/207 280/730.2 |
| 2005/0236819 A1 | 10/2005 | Riedel et al. | |
| 2006/0119083 A1* | 6/2006 | Peng | ..................... B60R 21/207 280/730.2 |
| 2012/0049498 A1 | 3/2012 | Wiik et al. | |
| 2012/0091697 A1 | 4/2012 | Wiik et al. | |
| 2013/0076014 A1* | 3/2013 | Thomas | ................ B60R 21/231 280/743.2 |

(Continued)

FOREIGN PATENT DOCUMENTS

| | | |
|---|---|---|
| DE | 19548905 A1 | 5/1999 |
| JP | 2000-185620 A | 7/2000 |

(Continued)

*Primary Examiner* — Darlene P Condra
(74) *Attorney, Agent, or Firm* — Oliff PLC

(57) ABSTRACT

A vehicle far side airbag device includes: a splitting portion at a front side of a seat cover, at a side section at a vehicle center side of vehicle seatback, extends along a height of the seatback; an airbag inside the side section, deploys toward an outside of the side section while splitting the splitting portion, to protect an occupant from head to abdomen; a diffuser housed at a lower and rear side within the airbag, ejects gas from an inflator from an upper end opening and a lower end opening; and a tensioning cloth fixed to both a seatback frame and a location at a lower end of the splitting portion, is superimposed on the airbag in a stored state. A portion of the tensioning cloth is positioned further to a seatback lower side than the lower end opening of the diffuser in a deployed state.

6 Claims, 5 Drawing Sheets

(56) References Cited

U.S. PATENT DOCUMENTS

| | | | |
|---|---|---|---|
| 2013/0093224 A1* | 4/2013 | Dainese | B60R 21/207 297/216.12 |
| 2013/0328294 A1* | 12/2013 | Fukawatase | B60R 21/2334 280/730.2 |
| 2014/0042733 A1* | 2/2014 | Fukawatase | B60R 21/23138 280/730.2 |
| 2014/0239618 A1 | 8/2014 | Katsumata | |
| 2014/0284907 A1* | 9/2014 | Akiyama | B60R 21/207 280/730.2 |
| 2014/0300088 A1* | 10/2014 | Fukawatase | B60R 21/13 280/729 |
| 2014/0327234 A1* | 11/2014 | Heurlin | B60R 21/207 280/730.1 |
| 2015/0014970 A1 | 1/2015 | Fujiwara | |
| 2015/0217714 A1* | 8/2015 | Fujiwara | B60R 21/23138 280/729 |
| 2015/0246656 A1* | 9/2015 | Fujiwara | B60R 21/2346 280/730.2 |
| 2015/0367803 A1* | 12/2015 | Fujiwara | B60R 21/207 280/728.2 |
| 2015/0367804 A1* | 12/2015 | Fujiwara | B60R 21/23138 280/730.2 |
| 2015/0367806 A1 | 12/2015 | Fujiwara | |

FOREIGN PATENT DOCUMENTS

| | | |
|---|---|---|
| JP | 2005-138665 A | 6/2005 |
| JP | 2005-306377 A | 11/2005 |
| JP | 2006-082664 A | 3/2006 |
| JP | 2011-178269 A | 9/2011 |
| JP | 2012-051557 A | 3/2012 |
| JP | 2012-081958 A | 4/2012 |
| WO | 2013/114591 A1 | 8/2013 |
| WO | 2014/115351 A1 | 7/2014 |

* cited by examiner

VEHICLE FAR SIDE AIRBAG DEVICE

CROSS-REFERENCE TO RELATED APPLICATION

This application is based on and claims priority under 35 USC 119 from Japanese Patent Application No. 2014-209107 filed on Oct. 10, 2014, the disclosure of which is incorporated by reference herein.

BACKGROUND

1. Technical Field

The present invention relates to a vehicle far side airbag device provided at a side section at a vehicle width direction center side of a seatback of a vehicle seat.

2. Related Art

In an airbag device (side airbag device) described in Japanese Patent Application Laid-Open (JP-A) No. 2012-051557, an airbag bag body includes an inflation location that inflates on receiving gas supplied from an inflator, and a non-inflation location. An opening is formed to the non-inflation location, and a tether inserted through the opening is connected to a rear end portion and a front end portion of the airbag bag body. A deployment trajectory of the airbag bag body is controlled by the tether.

However, the structure of the side airbag device described above is such that the airbag bag body is set with a large vehicle height direction dimension, and an upper portion of the airbag bag body, for protecting a head of an occupant, is not directly fixed to a seatback. There is accordingly a possibility that the upper portion of the airbag bag body sways greatly during inflation and deployment in cases in which a flow of gas ejected from the inflator inside the airbag bag body is not well controlled. There is accordingly room for improvement from the perspective of stabilizing deployment behavior of the airbag bag body.

SUMMARY

In consideration of the above circumstances, an object of the present invention is to obtain a vehicle far side airbag device that contributes to stabilizing deployment behavior of an airbag.

A vehicle far side airbag device of a first aspect of the present invention includes: a predetermined splitting portion that is formed at a front portion side of a seat cover, at a side section at a vehicle width direction center side of a seatback of a vehicle seat, and that extends along a height direction of the seatback; an airbag that is stored inside the side section, that inflates and deploys toward an outside of the side section while splitting open the predetermined splitting portion on being supplied with gas, and that protects an occupant from a head to as far as an abdominal region; a diffuser that is housed at a lower portion side and a rear portion side within the airbag, and that ejects gas generated by an inflator from an upper end opening and a lower end opening; and a tensioning cloth that is fixed to both a seatback frame and a location at a lower end side of the predetermined splitting portion, that is superimposed on the airbag in a stored state in a seat side view, and in which at least a portion of the tensioning cloth is positioned further to a seatback lower side than the lower end opening of the diffuser in a deployed state of the diffuser.

In the first aspect, the predetermined splitting portion extending along the seatback height direction at the front portion side of the seat cover is formed to the side section at the vehicle width direction center side of the seatback of the vehicle seat. The airbag that protects the occupant from the head to as far as the abdominal region in the inflated and deployed state is stored inside the side section, and the diffuser is housed inside the airbag. The diffuser ejects gas generated by the inflator from the upper end opening and the lower end opening. Gas is thereby supplied into the airbag in the stored state, and the airbag starts to inflate.

In seat side view, the airbag in the stored state is superimposed with the tensioning cloth that is fixed to both the seatback frame and the location at the lower end side of the predetermined splitting portion. In the deployed state of the diffuser, at least a portion of the tensioning cloth is positioned further to the seatback lower side than the lower end opening of the diffuser. The airbag in the stored state starts to inflate at an early stage at the height at which at least this portion is positioned, due to high pressure gas being ejected from the lower end opening, thereby enabling tension to act on the tensioning cloth at an early stage due to the inflation pressure of the airbag. This enables the predetermined splitting portion to split open from the location at the lower end side where the tensioning cloth is fixed, thereby enabling the airbag to inflate and deploy from the lower end portion side toward the side section exterior.

Some of the gas supplied to the lower end portion side of the airbag flows toward an upper portion of the airbag, such that gas is supplied to the upper portion of the airbag from two paths, these being the path from the lower end portion side of the airbag, and the path from the upper end opening of the diffuser. Balancing the flow rates of the gas supplied along these two paths enables the upper portion of the airbag to be stably inflated and deployed from bottom to top. This contributes to stabilizing the deployment behavior of the airbag.

A vehicle far side airbag device of a second aspect of the present invention is the first aspect, wherein the airbag is partitioned into a front bag section and a rear bag section by a partitioning section formed with a communication hole, and the diffuser is housed inside the rear bag section.

In the second aspect, gas generated by the inflator is ejected into the rear bag section from the upper end opening and the lower end opening of the diffuser, and some of the gas ejected into the rear bag section is supplied into the front bag section through the communication hole formed to the partitioning section. The rear bag section inflates and deploys at an earlier stage and a higher pressure than the front bag section when this occurs, such that the higher inflation pressure of the rear bag section is applied to a location at the lower end side of the predetermined splitting portion through the tensioning cloth at an early stage, thereby enabling the location at the lower end side of the predetermined splitting portion to be quickly split open.

As explained above, the vehicle far side airbag device according to the present invention contributes to stabilizing deployment behavior of an airbag.

BRIEF DESCRIPTION OF THE DRAWINGS

Exemplary embodiments of the present invention will be described in detail based on the following figures, wherein.

DETAILED DESCRIPTION

Figure 1:
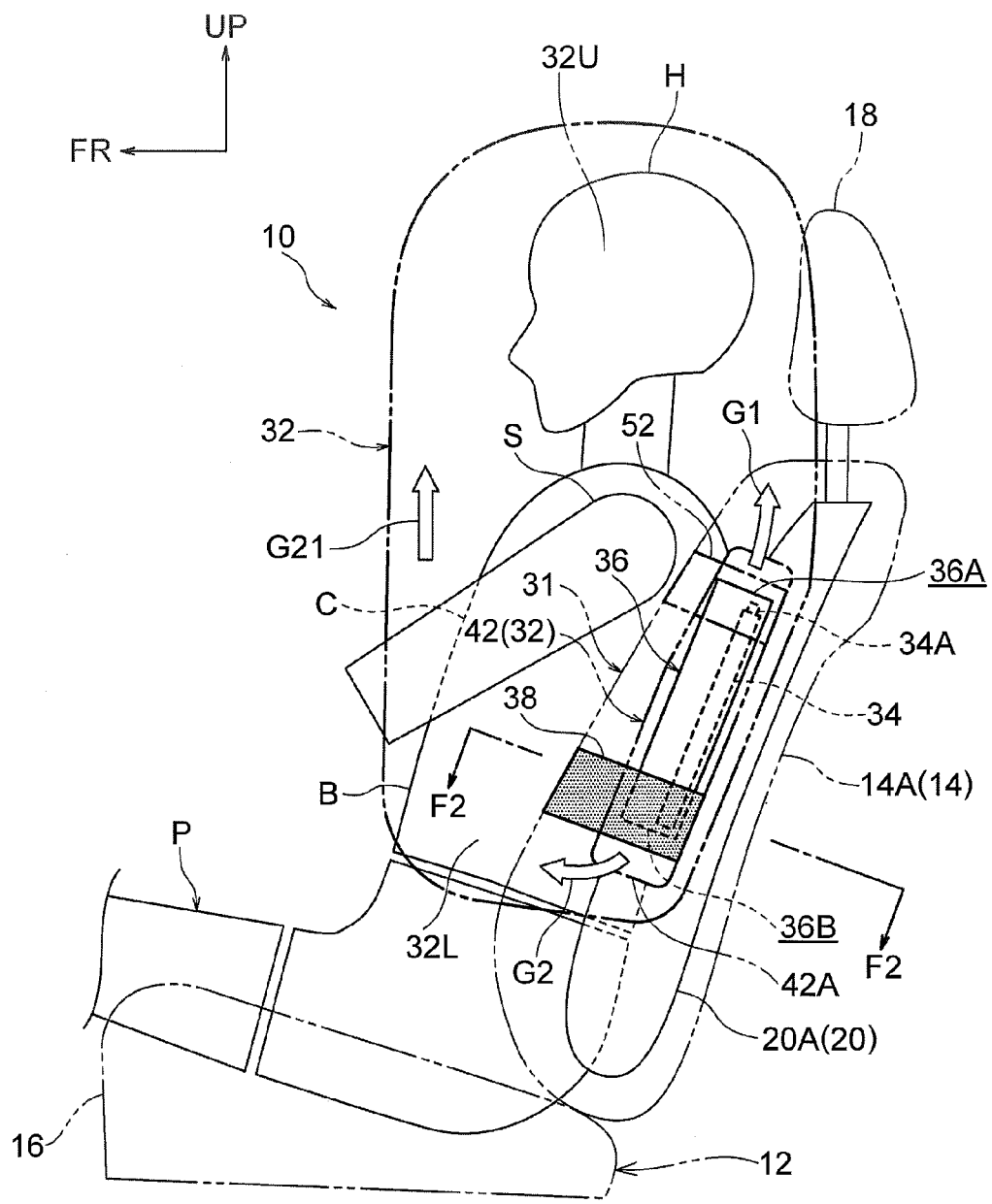
FIG. 1 is a side view of a vehicle seat installed with a vehicle far side airbag device according to an exemplary embodiment of the present invention, illustrating an inflated and deployed state of an airbag.
Figure 2:
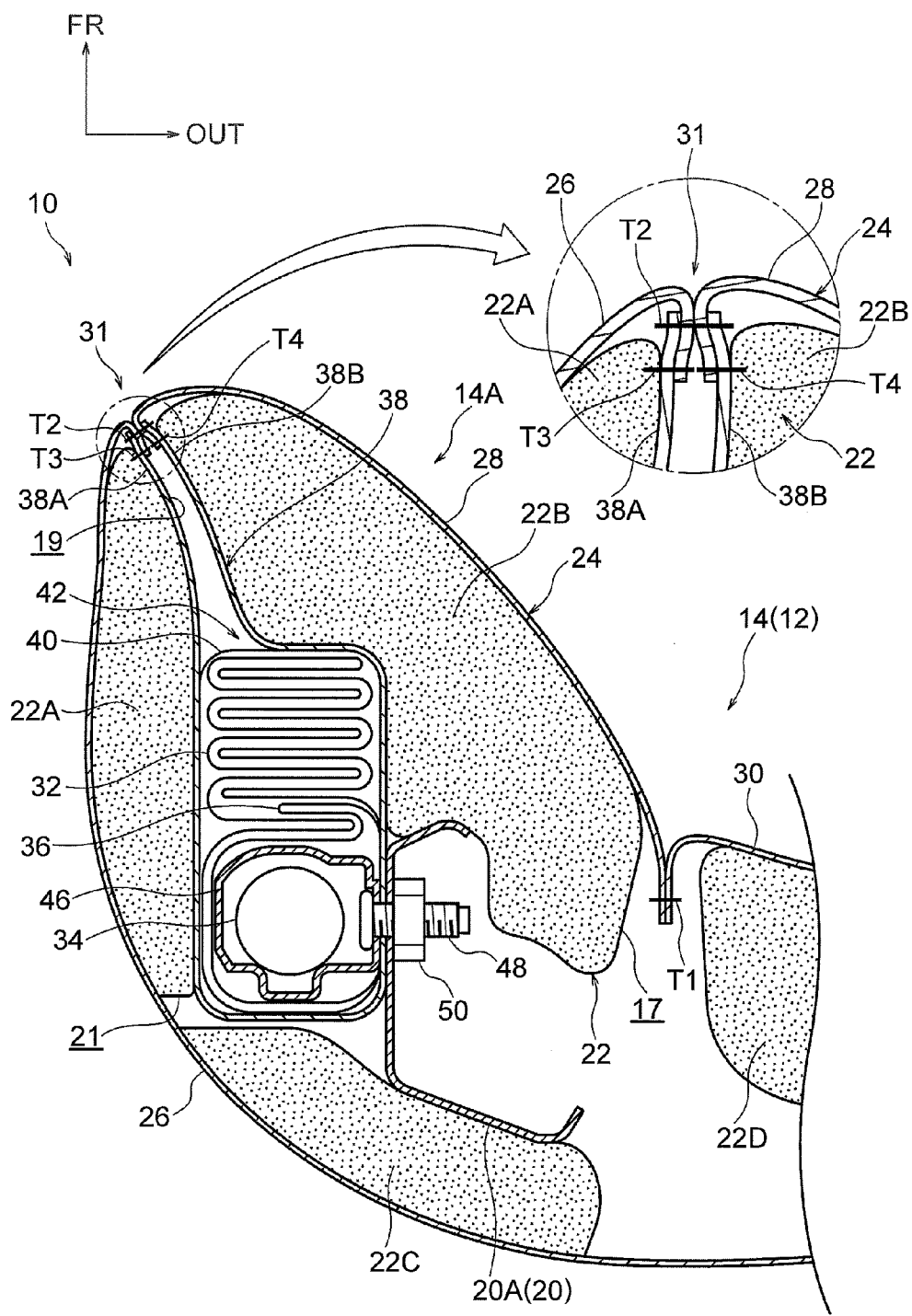
FIG. 2 is an enlarged cross-section taken along line F2-F2 in FIG. 1.
Figure 3:
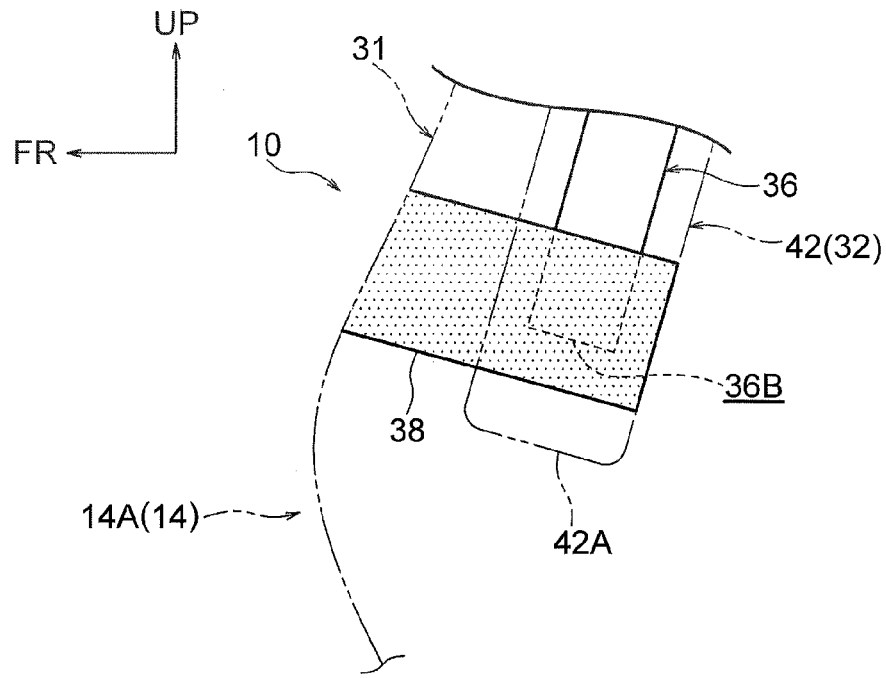
FIG. 3 is an enlarged side view illustrating an enlarged portion of FIG. 1.

Explanation follows regarding a vehicle far side airbag device 10 according to an exemplary embodiment of the present invention, with reference to FIG. 1 to FIG. 3. Note that in each of the drawings, the arrow FR, the arrow UP, and the arrow OUT respectively indicate the front direction (direction of travel), the upper direction, and the width direction outside of a vehicle, as appropriate. Unless specifically stated otherwise, simple reference below to the front-rear, left-right, and up-down directions refers to front-rear in the vehicle front-rear direction, left-right in the vehicle left-right direction (vehicle width direction), and up-down in the vehicle up-down direction.

Configuration

The vehicle far side airbag device 10 illustrated in FIG. 1 and FIG. 2 is a device mainly for protecting an occupant at the opposite side to a collision side during a side-on collision of the vehicle. The vehicle far side airbag device 10 is provided to a vehicle center-side side support section 14A (vehicle width direction center-side side section, hereafter simply referred to as "center-side side section 14A") of a seatback 14 of a vehicle seat 12. The vehicle seat 12 is, for example, a driving seat in a right-hand drive vehicle. The seatback 14 of the vehicle seat 12 is reclinably coupled to a rear end section of a seat cushion 16, and an upper end section of the seatback 14 is coupled to a headrest 18.

Note that in the present exemplary embodiment, the front-rear direction, left-right direction (width direction), and up-down direction of the vehicle seat 12 are aligned with the front-rear direction, left-right direction, and up-down direction of the vehicle. In FIG. 1, a crash test dummy P is illustrated seated in the vehicle seat 12 instead of an actual occupant. The dummy P is, for example, a World Side Impact Dummy (World SID) of an AM50 (a $50^{th}$ percentile American adult male). The dummy P is seated in a standard seated posture specified in collision testing methods. A front-rear position of the seat cushion 16 with respect to the vehicle, and a slope position (slope angle) of the seatback 14 with respect to the seat cushion 16 are adjusted to reference set positions corresponding to the seated posture. In order to facilitate understanding of the explanation, the dummy P is hereafter referred to as "occupant P".

As illustrated in FIG. 2, in the seatback 14, a seatback pad 22 attached to a seatback frame 20 is covered by a seat cover 24. The seatback frame 20 (not illustrated in FIG. 3) configures a frame of the seatback 14, and includes left and right side frames 20A extending along the height direction of the seatback 14 at both left and right sides of the seatback 14 (the side frame 20A on the seat right side is not illustrated in FIG. 2).

The seatback pad 22 configures a cushion member of the seatback 14, and includes an outside pad portion 22A configuring a seat width direction outside portion of the center-side side section 14A, and an inside pad portion 22B configuring a seat width direction inside portion of the center-side side section 14A. The seatback pad 22 also includes a rear side pad portion 22C configuring a seat rear side portion of the center-side side section 14A, and a center pad portion 22D disposed further to the center side of the seatback 14 than the inside pad portion 22B. Note that, although integrally formed, the outside pad portion 22A, the inside pad portion 22B, the rear side pad portion 22C, and the center pad portion 22D are divided by cavities 17, 19, 21 formed to the seatback pad 22 at the cross-section illustrated in FIG. 2.

The seat cover 24 configures a cover member of the seatback 14, and includes a side cover 26 covering the outside pad portion 22A from the seat width direction outside, a front side cover 28 covering the inside pad portion 22B from the seat front side, and a front cover 30 covering the center pad portion 22D from the seat front side. The side cover 26 extends to the rear sides of the rear side pad portion 22C and the pad center portion 22D, and is also disposed at a back face of the seatback 14.

A seat width direction inside end portion of the front side cover 28 and a seat width direction outside end portion of the front cover 30 are sewn (stitched) together at a sewn portion T1 positioned at a seat width direction inside end portion of the center-side side section 14A. A seat width direction outside end portion of the front side cover 28 and a seat front side end portion of the side cover 26 are sewn together at a sewn portion T2 positioned at a front end portion (what is referred to as a frame portion) of the center-side side section 14A. The sewn portion T2 extends along the frame portion of the center-side side section 14A in the height direction of the seatback 14.

In the present exemplary embodiment, a location of the seat cover 24 along the sewn portion T2 configures a burst line portion 31 that is a predetermined splitting portion. The burst line portion 31 configures a portion of the vehicle far side airbag device 10. Namely, the vehicle far side airbag device 10 according to the present exemplary embodiment includes a portion of the vehicle seat 12 as a configuration element. Thus the present exemplary embodiment may be considered to be an exemplary embodiment relating to an invention of a vehicle seat provided with a far side airbag device. Note that the burst line portion 31 that is a predetermined splitting portion is not limited to a configuration formed to the frame portion of the center-side side section 14A, and may be configured formed to a seat width direction outside face of the center-side side section 14A.

An airbag (far side airbag, bag body) 32, an inflator 34 (not illustrated in FIG. 3), a diffuser 36, and a tensioning cloth 38, these being configuration members of the vehicle far side airbag device 10, are stored inside the center-side side section 14A with the above configuration. The airbag 32 configures a module together with the inflator 34 and the diffuser 36, and is folded by a specific folding method such as pleating or rolling (pleating in this example). The folded airbag 32 is then wrapped in an easily breakable wrapping member 40 (see FIG. 2), thereby forming an elongated rectangular box shaped package 42. The package 42 is stored inside the center-side side section 14A oriented with its length direction along the height direction of the seatback 14.

The airbag 32 is formed in an elongated bag shape by folding a single base cloth in two, formed by cutting out a cloth material made of nylon thread or polyester thread, for example, and stitching together outer peripheral edge portions of the folded base cloth. The airbag 32 inflates and deploys toward the vehicle width direction center side of the occupant P (the front side of the center-side side section 14A) due to pressure of gas generated by the inflator 34 (the state illustrated in FIG. 1). Configuration is such that, during inflation and deployment, the sewn portion T2 previously described breaks under inflation pressure of the airbag 32 and the seat cover 24 splits open at the burst line portion 31, such that the airbag 32 inflates toward the outside of the center-side side section 14A. Note that unless specifically stated otherwise, the front-rear and up-down directions of the airbag 32 described in the below explanation refer to the directions of the airbag 32 in the inflated and deployed state, and are substantially aligned with the front-rear and up-down directions of the vehicle.

When the inflated and deployed state is viewed from the side of a side face as illustrated in FIG. 1 (the vehicle width direction center side in this example), the airbag 32 is formed so as to form an elongated, substantially rectangular shape (a substantially elliptical shape) along the vehicle up-down direction. The airbag 32 is formed with a size capable of protecting the occupant P from the head H to as far as the abdominal region B (the head H, the shoulder region S, the chest C, and the abdominal region B). In the present exemplary embodiment, an upper portion 32U of the airbag 32 inflates and deploys at the side of the head H of the occupant P, and a lower end portion 32L of the airbag 32 inflates and deploys at the side of the waist of the occupant P. Note that the airbag 32 illustrated by a double-dotted dashed line in FIG. 1 represents a state directly prior to protecting (restraining) the occupant P from the head H to as far as the abdominal region B (a non-restraining inflated and deployed state, hereafter simply referred to as "inflated and deployed state"). The shape of the airbag 32 is not limited to the shape illustrated in FIG. 1, and may be changed as appropriate.

The inflator 34 and the diffuser 36 are housed at a lower portion side and a rear end side inside the airbag 32. The diffuser 36 is a member referred to as a loop diffuser, an inner tube, a flow regulating cloth, or the like, and is formed by stitching a base cloth, formed by cutting a similar cloth material to the base cloth of the airbag 32 into a rectangular shape, into a circular cylindrical shape. The diffuser 36 is disposed oriented with its axial line direction along the height direction of the seatback 14. In the present exemplary embodiment, the diffuser 36 is set with the same diameter from an upper end to a lower end thereof, and an upper end opening 36A formed at the upper end, and a lower end opening 36B formed at the lower end of the diffuser 36 are set with the same opening area. The diffuser 36 has a function to distribute gas generated by the inflator 34 up and down. Note that the material of the diffuser 36 is not limited to a cloth material such as that described above, and a flexible material in sheet form may be employed instead.

The inflator 34 is what is referred to as a cylinder type gas generator, and is formed in a circular cylindrical shape. The inflator 34 is formed with an axial line direction dimension that is slightly shorter than the diffuser 36, and is housed inside the diffuser 36 oriented with its axial line direction along the axial line direction of the diffuser 36. As illustrated in FIG. 2, the inflator 34 is fixed to a bracket 46 (not illustrated in FIG. 1) by a means such as crimping. A pair of upper and lower stud bolts 48 project out from the bracket 46 toward the vehicle width direction outside (see FIG. 2). The stud bolts 48 pierce through the base cloth of the airbag 32, the base cloth of the diffuser 36, and the side frame 20A, and nuts 50 are screwed onto leading end sides of the stud bolts 48. The inflator 34 is accordingly fastened and fixed to the seatback frame 20 together with the airbag 32 and the diffuser 36.

The inflator 34 is electrically connected to an ECU (controller), not illustrated in the drawings, installed in the vehicle. A side collision sensor, not illustrated in the drawings, for detecting a side-on collision of the vehicle is electrically connected to the ECU. The ECU and the side collision sensor are configuration members of the vehicle far side airbag device 10.

The ECU is configured to operate (actuate) the inflator 34 when (the inevitability of) a side-on collision of the vehicle has been detected based on a signal from the side collision sensor. Specifically, since the vehicle far side airbag device 10 according to the present exemplary embodiment is installed to the vehicle seat 12 that is the driving seat in a right-hand drive vehicle, the inflator 34 is actuated when the ECU has detected that another vehicle has collided with a side section (left side section) at a front passenger seat side of the vehicle. Note that, in cases in which a pre-crash sensor that predicts (forecasts) a side-on collision is electrically connected to the ECU, the inflator 34 may be configured to be actuated when the ECU has predicted a side-on collision based on a signal from the pre-crash sensor.

On actuation of the inflator 34, gas is ejected inside the diffuser 36 from a gas ejection portion 34A provided to one of either an upper end portion or a lower end portion of the inflator 34 (the upper end portion in this example). Although the diffuser 36 is normally folded together with the airbag 32 and housed inside the center-side side section 14A as illustrated in FIG. 2, the diffuser 36 inflates and deploys in a circular cylindrical shape due to the pressure of the gas when gas is ejected from the inflator 34 as described above. The diffuser 36 then ejects gas G1 toward the upper side of the seatback 14 from the upper end opening 36A (see FIG. 1), and ejects gas G2 toward the lower side of the seatback 14 from the lower end opening 36B (see FIG. 1). Gas G1 ejected from the upper end opening 36A is supplied to an upper portion side of the airbag 32, and gas G2 ejected from the lower end opening 36B is supplied to a lower end side of the airbag 32. The airbag 32 inflates and deploys accordingly.

Note that FIG. 1 and FIG. 3 illustrate an deployed state of the diffuser 36 in a state in which gas is not being ejected from the inflator 34 (hereafter simply referred to as "deployed state"), rather than an inflated and deployed state of the diffuser, namely a state in which gas is being ejected from the inflator 34. In the state in which gas is being ejected from the inflator 34, gas is forcefully ejected from the upper end opening 36A and the lower end opening 36B, such that the upper end opening 36A and the lower end opening 36B are displaced from the positions illustrated in FIG. 1.

The tensioning cloth 38 is formed, for example, in an elongated belt shape using a cloth material that is more difficult to stretch than the base cloth of the airbag 32, and, as illustrated in FIG. 1 and FIG. 3, is installed so as to be superimposed on a lower portion of the package 42 in seat side view. In the present exemplary embodiment, in the cross-section plan view illustrated in FIG. 2, the lower portion of the package 42 is enclosed by the tensioning cloth 38, and part of a length direction intermediate portion of the tensioning cloth 38 is sandwiched between the package 42 and the side frame 20A. The lower side stud bolt 48 out of the pair of upper and lower stud bolts 48 of the bracket 46 previously described pierces through this portion. The length direction intermediate portion of the tensioning cloth 38 is thereby fixed to the side frame 20A.

Both length direction end sides of the tensioning cloth 38 extend from the package 42 toward the seat front side, and are inserted into the cavity 19 formed between the outside pad portion 22A and the inside pad portion 22B. Both length direction end portions 38A, 38B of the tensioning cloth 38 are fixed (sewn) at a location of the seat cover 24 at a lower end side of the burst line portion 31.

Specifically, as illustrated in FIG. 2, one length direction end portion 38A of the tensioning cloth 38 is sewn (fixed) to a front end portion of the side cover 26 at the sewn portion T2 previously described and a separate sewn portion T3. The other length direction end portion 38B of the tensioning cloth 38 is sewn (fixed) to the seat width direction outside end portion of the front side cover 28 at the sewn portion T2 and a separate sewn portion T4. A weaker thread is employed to stitch the sewn portion T2 than the threads employed to stitch the stitched portions T3, T4. Note that "a location . . . at a lower end side of the burst line portion 31" described above refers to a location positioned further to the lower side of the seatback 14 than the height direction center of the seatback 14.

In the deployed state of the diffuser 36 illustrated in FIG. 1 and FIG. 3, a portion of the tensioning cloth 38 (a location at a lower end side) is installed so as to be positioned further to the lower side of the seatback 14 than the lower end opening 36B of the diffuser 36. Namely, in the deployed state of the diffuser 36, the tensioning cloth 38 is disposed at a position superimposed on the lower end opening 36B of the diffuser 36 in seat side view, and a height direction dimension (up-down width dimension) of the tensioning cloth 38 is set so as to straddle across the lower end opening 36B in the height direction of the seatback 14 in seat side view. In the present exemplary embodiment, the tensioning cloth 38 is installed so as to enclose the lower end opening 36B of the diffuser 36 in the deployed state from the front-rear direction and the left-right direction of the seatback 14. The tensioning cloth 38 is also disposed so as to be positioned further to the upper side of the seatback 14 than a lower end 42A of the package 42 (namely, a lower end of the airbag 32 in the folded state), and a lower end portion of the package 42 projects out further to the lower side of the seatback 14 than the tensioning cloth 38.

Note that the manner of installing the tensioning cloth 38 when the seatback 14 is viewed in plan-view cross-section in not limited to that illustrated in FIG. 2, and may be changed as appropriate. A configuration may be applied, for example, in which a pair of left and right tensioning cloths are installed. In such cases, for example, one tensioning cloth has one length direction end portion stitched to the side cover 26 at the sewn portion T3, a length direction intermediate portion installed between the side cover 26 and the outside pad portion 22A, and the other length direction end side inserted through the cavity 21 and extending out toward a rear face side of the side frame 20A. The other tensioning cloth has one length direction end portion stitched to the front side cover 28 at the sewn portion T4, a length direction intermediate portion installed between the front side cover 28 and the inside pad portion 22B, and the other length direction end side extending out toward the rear face side of the side frame 20A. The other length direction end portions of the pair of tensioning cloths are both fixed to a bracket, and the bracket is configured fixed to the rear face of the side frame 20A or the like.

Operation and Advantageous Effects

Explanation follows regarding operation and advantageous effects of the present exemplary embodiment.

In the present exemplary embodiment, the folded airbag 32 is configured as the package 42 together with inflator 34 and the diffuser 36, and stored inside the center-side side section 14A of the seatback 14. The inflator 34 is operated when the ECU has detected a side-on collision based on a signal from the side collision sensor, and gas is ejected from the gas ejection portion 34A. The inflator 34 is housed inside the diffuser 36, and the diffuser 36 inflates and deploys while ejecting gas ejected from the gas ejection portion 34A from the upper end opening 36A and the lower end opening 36B. Gas is thereby supplied into the airbag 32 in the stored state, and the airbag 32 starts to inflate.

In seat side view, the package 42 (the airbag 32 in the stored state) is superimposed with the tensioning cloth 38 fixed to both the location of the seat cover 24 at the lower end side of the burst line portion 31, and the side frame 20A. In the deployed state of the diffuser 36 illustrated in FIG. 1, a portion of the tensioning cloth 38 is positioned further to the lower side of the seatback 14 than the lower end opening 36B of the diffuser 36. The airbag 32 in the stored state starts to inflate at an early stage at the height at which this portion is positioned, due to high pressure gas being ejected from the lower end opening 36B, thereby enabling tension to act on the tensioning cloth 38 at an early stage due to the inflation pressure of the airbag 32. This enables the burst line portion 31 to split open from the location at the lower end side where the tensioning cloth 38 is fixed, thereby enabling the airbag 32 to inflate and deploy from the lower end portion 32L side toward the center-side side section 14A exterior.

Some of the gas supplied to the lower end portion 32L side of the airbag 32 flows toward the upper portion 32U of the airbag 32 (see the arrow G21 in FIG. 1), such that the gas G1, G21 is supplied to the upper portion 32U of the airbag 32 from two paths, these being the path from the lower end portion 32L side of the airbag 32, and the path from the upper end opening 36A of the diffuser 36. Balancing the flow rates of the gas G1, G21 enables the upper portion 32U of the airbag 32 to be stably inflated and deployed from bottom to top. This contributes to stabilizing the deployment behavior of the airbag 32. This enables, for example, improved protection performance of the head H of the occupant P by the upper portion 32U of the airbag 32.

In the present exemplary embodiment, the tensioning cloth 38 is disposed so as to be positioned further to the upper side of the seatback 14 than the lower end 42A of the package 42, namely, the lower end of the airbag 32 in the folded state. This enables the inflation pressure of the airbag 32 attempting to inflate at an early stage in the vicinity of the lower end opening 36B due to high pressure gas being ejected from the lower end opening 36B to be economically applied to the tensioning cloth 38. Tension thereby acts on the tensioning cloth 38 at an early stage, enabling the burst line portion 31 to be quickly split open.

Additional Explanation of Exemplary Embodiment

Note that the above exemplary embodiment has a configuration in which the tensioning cloth 38 is only provided to the lower portion side of the package 42; however, the present invention is not limited thereto. In cases in which the burst line portion 31 does not smoothly split open at the upper portion side of the package 42, for example, an upper side tensioning cloth may be added to an upper portion side of the package 42 (see, for example, an upper side tensioning cloth 52 illustrated by a double-dotted dashed line in FIG. 1).

In the above exemplary embodiment, the upper end opening 36A and the lower end opening 36B of the diffuser 36 are configured set with the same opening area; however, the present invention is not limited thereto. The diffuser 36 may be formed, for example, so as to increase in diameter on progression from the upper end toward the lower end thereof, and the opening area of the lower end opening 36B may be set larger than the opening area of the upper end opening 36A. This enables the flow rate of the gas G2 illustrated in FIG. 1 to be made greater than the flow rate of the gas G1, thereby enabling the upper portion of the airbag 32 to be more stably inflated and deployed from bottom to top by the gas G1 and the gas G21.

In the above exemplary embodiment, the gas ejection portion 34A of the inflator 34 is configured provided to the upper end portion of the inflator 34; however, the present invention is not limited thereto. Namely, setting the gas ejection portion 34A at the lower end portion of the inflator 34 enables the flow rate of the gas G2 to be made greater than the flow rate of the gas G1, similarly to as described above.

Explanation follows regarding various modified examples of the above exemplary embodiment. Note that configuration and operation that are basically the same as in the above exemplary embodiment are appended with the same reference numerals as the above exemplary embodiment, and explanation thereof is omitted.

First Modified Example

Figure 4:
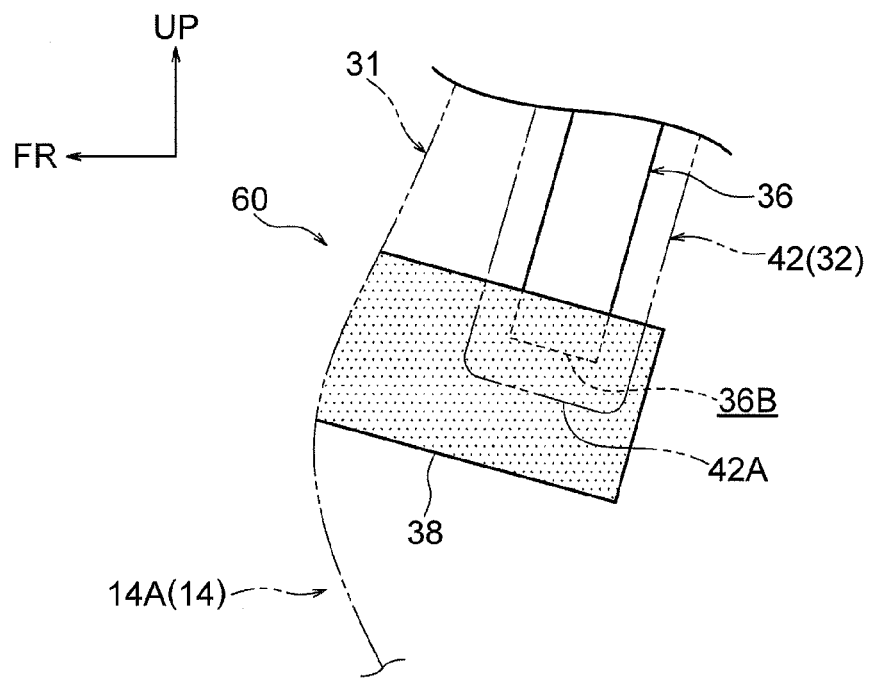
FIG. 4 is a side view corresponding to FIG. 3, illustrating a first modified example of an exemplary embodiment of the present invention.

FIG. 4 is a side view corresponding to FIG. 3, illustrating a first modified example 60 of a vehicle side airbag device according to an exemplary embodiment of the present invention. In the first modified example 60, the tensioning cloth 38 is disposed in a position superimposed on the lower end opening 36B of the diffuser 36 in the deployed state, and the lower end 42A of the package 42 in seat side view. Namely, in the first modified example 60, the tensioning cloth 38 is installed such that a portion thereof is positioned further to the lower side of the seatback 14 than the lower end opening 36B of the diffuser 36 in the deployed state, and the lower end 42A of the package 42.

In the first modified example 60, the airbag 32 in the stored state starts to inflate at an early stage at the height at which the above-mentioned portion of the tensioning cloth 38 is positioned due to high pressure gas being ejected from the lower end opening 36B, thereby enabling tension to act on the tensioning cloth 38 at an early stage due to the inflation pressure of the airbag 32. This enables basically the same operation and advantageous effects to be obtained as in the previous exemplary embodiment. The first modified example 60 enables the tensioning cloth 38 to be disposed further to the lower side of the seatback 14 than in the previous exemplary embodiment, thereby enabling a location of the burst line portion 31 that is further to the lower end side to be split open at an early stage by the tensioning cloth 38.

Second Modified Example

Figure 5:
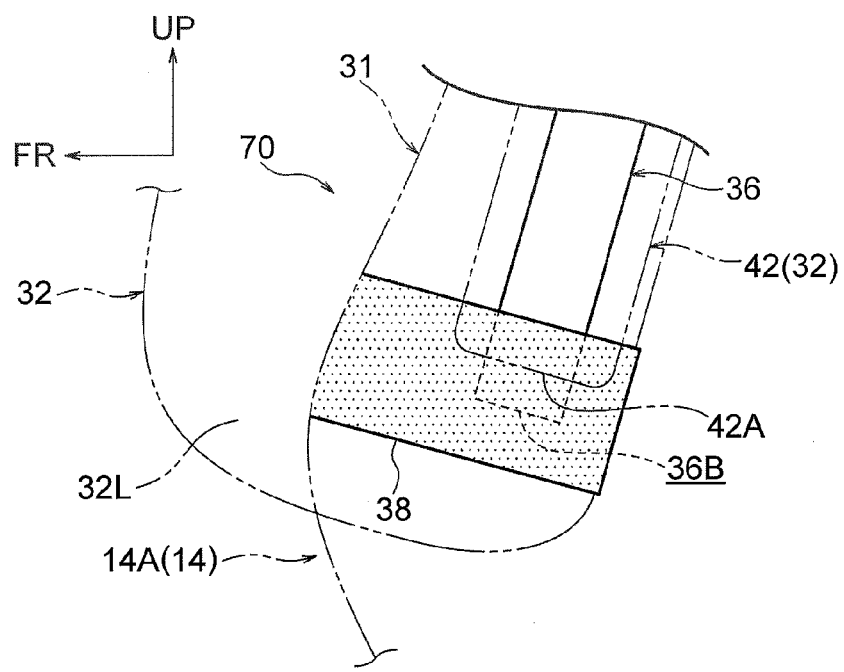
FIG. 5 is a side view corresponding to FIG. 3, illustrating a second modified example of an exemplary embodiment of the present invention.

FIG. 5 is a side view corresponding to FIG. 3, illustrating a second modified example 70 of a vehicle side airbag device according to an exemplary embodiment of the present invention. In the second modified example 70, the tensioning cloth 38 is disposed at a position superimposed on the lower end opening 36B of the diffuser 36 in the deployed state and the lower end 42A of the package 42 in seat side view, similarly to in the first modified example. However, in the second modified example 70, the lower end 42A of the package 42 is set further to the upper side of the seatback 14 than the lower end opening 36B of the diffuser 36 in the deployed state. Namely, in the second modified example 70, configuration is such that a lower end portion of the diffuser 36 is folded together with the lower end portion 32L of the airbag 32 when the airbag 32 is folded to form the package 42.

In the second modified example 70, the folded state of the lower end portion of the diffuser 36 is released together with that of the lower end portion 32L of the airbag 32, and gas is ejected from the lower end opening 36B when gas is ejected from the inflator 34 (not illustrated in FIG. 5). The lower end portion 32L of the airbag 32 starts to inflate at an early stage due to the high pressure gas being ejected from the lower end opening 36B, thereby enabling tension to act on the tensioning cloth 38 at an early stage due to the inflation pressure of the lower end portion 32L. This enables basically the same operation and advantageous effects to be obtained as in the previous exemplary embodiment. Moreover, in the second modified example 70, the lower end portion of the diffuser 36 is configured folded as described above, thereby enabling increased degrees of freedom for setting the position of the lower end 42A of the package 42 and the position of the lower end opening 36B of the diffuser 36 in the deployed state.

Third Modified Example

Figure 6:
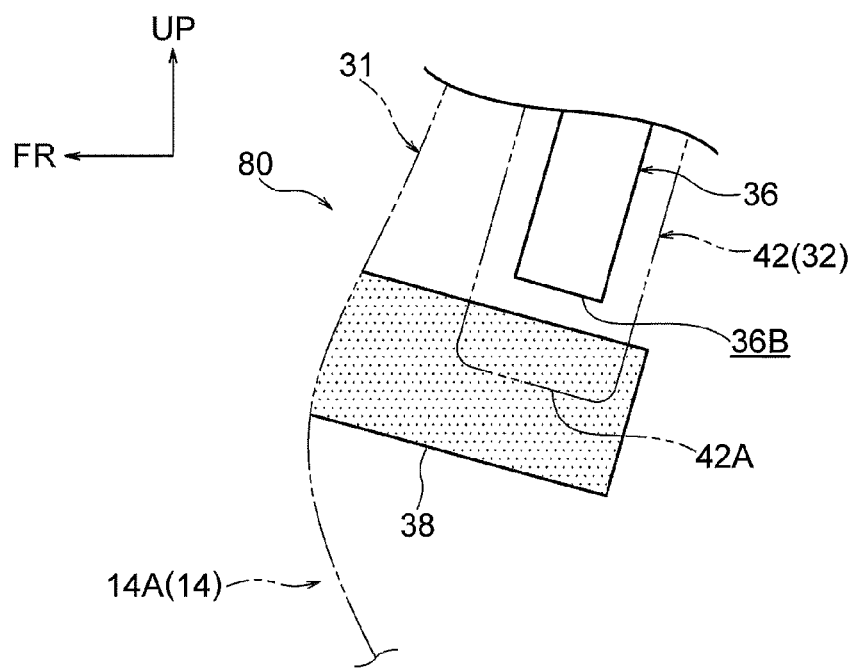
FIG. 6 is a side view corresponding to FIG. 3, illustrating a third modified example of an exemplary embodiment of the present invention.

FIG. 6 is a side view corresponding to FIG. 3, illustrating a third modified example 80 of a vehicle side airbag device according to an exemplary embodiment of the present invention. In the third modified example 80, the tensioning cloth 38 is disposed in a position superimposed on the lower end 42A of the package 42 in seat side view, and is disposed such that the entire tensioning cloth 38 is positioned further to the lower side of the seatback 14 than the lower end opening 36B of the diffuser 36 in the deployed state.

In the third modified example 80, the airbag 32 in the stored state starts to inflate at an early stage at the height at which the tensioning cloth 38 is disposed due to the high pressure gas being ejected from the lower end opening 36B, thereby enabling tension to act on the tensioning cloth 38 at an early stage due to the inflation pressure of the airbag 32. This enables basically the same operation and advantageous effects to be obtained as in the previous exemplary embodiment. Moreover, in the third modified example 80, the tensioning cloth 38 is disposed at a position further to the lower side of the seatback 14 than the lower end opening 36B of the diffuser 36 in the deployed state. This enables the tensioning cloth 38 to be disposed further to the lower side of the seatback 14, regardless of the position (height) of the lower end opening 36B of the diffuser 36, thereby enabling a location of the burst line portion 31 that is further to the lower end side to be split open at an early stage by the tensioning cloth 38.

Fourth Modified Example

Figure 7:
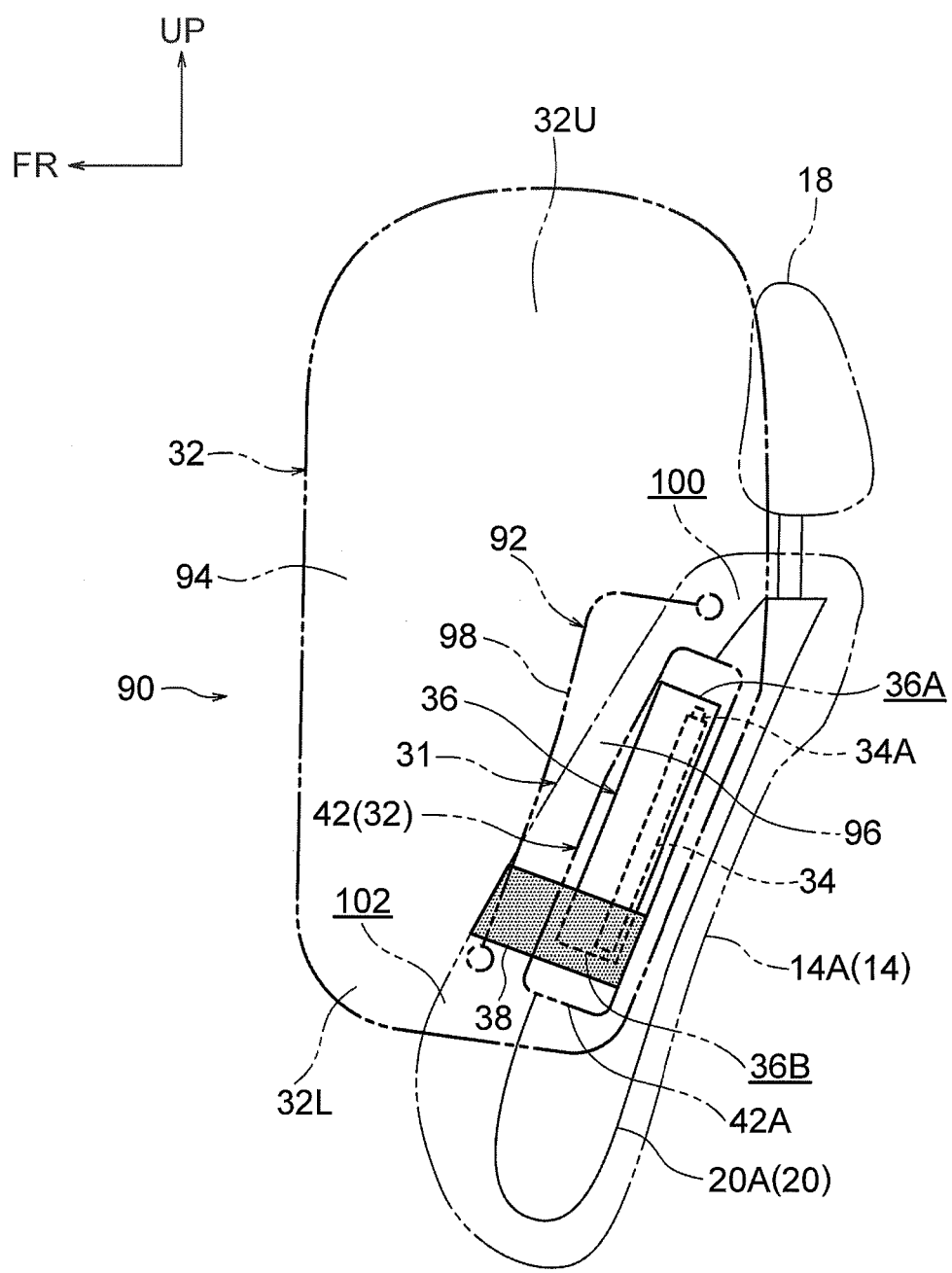
FIG. 7 is a side view corresponding to a portion of FIG. 1, illustrating a fourth modified example of an exemplary embodiment of the present invention.

FIG. 7 is a side view corresponding to a portion of FIG. 1, illustrating a fourth modified example 90 of a vehicle side airbag device according to an exemplary embodiment of the present invention. In the fourth modified example 90, the airbag 32 is partitioned by a partitioning section 92 into a front bag section 94 for protecting the head H and front portions of the chest C and abdominal region B of the occupant P (not illustrated in FIG. 7), and a rear bag section 96 for protecting the shoulder region S and rear portions of the chest C and abdominal region B of the occupant P.

The partitioning section 92 is configured by a stitched portion (seam) 98 at which the base cloth of the airbag 32 is stitched together, and an upper side communication hole 100 and a lower side communication hole 102 (each of which is a communication hole). The upper side communication hole 100 and the lower side communication hole 102 are each what is referred to as an inner vent hole, and are formed by partially omitting the stitched portion 98. Note that, in cases in which a partitioning section is configured by a tether (partitioning cloth), communication holes (openings) are formed in the tether.

The upper side communication hole 100 is set at an upper end portion of the partitioning section 92, and places an upper portion inside the front bag section 94 and an upper end portion inside the rear bag section 96 in communication with each other along the up-down direction of the airbag 32 at an up-down direction intermediate portion of a rear end portion of the airbag 32. The lower side communication hole 102 is set at a lower end portion of the partitioning section 92, and places a lower end portion inside the front bag section 94 and a lower end portion inside the rear bag section 96 in communication with each other along the front-rear direction of the airbag 32 at a front-rear direction intermediate portion of a lower end portion of the airbag 32. The inflator 34 and the diffuser 36 are housed at a rear portion side inside the rear bag section 96.

In the fourth modified example 90, gas ejected from the inflator 34 is ejected into the rear bag section 96 from the upper end opening 36A and the lower end opening 36B of the diffuser 36, and some of the gas ejected into the rear bag section 96 is supplied into the front bag section 94 through the upper side communication hole 100 and the lower side communication hole 102. The rear bag section 96 inflates and deploys at an earlier stage and a higher pressure than the front bag section 94 when this occurs, such that the higher inflation pressure of the rear bag section 96 is applied to a location at the lower end side of the burst line portion 31 through the tensioning cloth 38 at an early stage, thereby enabling the location at the lower end side of the burst line portion 31 to be quickly split open.

The present invention has been explained above with reference to an exemplary embodiment and various modified examples; however, various modifications may be implemented within a range not departing from the spirit of the present invention. Obviously the scope of rights of the present invention is not limited by the above exemplary embodiment or any of the above modified examples.

What is claimed is:

1. A vehicle far side airbag device comprising:
a predetermined splitting portion that is formed at a front portion side of a seat cover, at a side section at a vehicle width direction center side of a seatback of a vehicle seat, and that extends along a height direction of the seatback;
an airbag that is stored inside the side section, that inflates and deploys toward an outside of the side section while splitting open the predetermined splitting portion on being supplied with gas, and that protects an occupant from a head to as far as an abdominal region;
a diffuser that is housed at a lower portion side and a rear portion side within the airbag, and that ejects gas generated by an inflator from an upper end opening and a lower end opening; and
a tensioning cloth that is fixed to both a seatback frame and a location at a lower end side of the predetermined splitting portion, that is superimposed on the airbag in a stored state in a seat side view, and in which at least a portion of the tensioning cloth is positioned further to a seatback lower side than the lower end opening of the diffuser in a deployed state of the diffuser.

2. The vehicle far side airbag device of claim 1, wherein:
the airbag is partitioned into a front bag section and a rear bag section by a partitioning section formed with a communication hole; and
the diffuser is housed inside the rear bag section.

3. The vehicle far side airbag device of claim 1, wherein:
the tensioning cloth is disposed so as to be positioned further to an upper side of the seatback than a lower end of the airbag in the stored state.

4. The vehicle far side airbag device of claim 1, wherein:
the tensioning cloth is disposed in a position superimposed on the lower end opening of the diffuser in the deployed state, and a lower end of the airbag in the stored state in the seat side view.

5. The vehicle far side airbag device of claim 4, wherein:
the lower end of the airbag in the stored state is set further to an upper side of the seatback than the lower end opening of the diffuser in the deployed state.

6. The vehicle far side airbag device of claim 4, wherein:
the tensioning cloth is disposed in a position superimposed on the lower end of the airbag in the stored state in the seat side view, and is disposed such that the entire tensioning cloth is positioned further to the lower side of the seatback than the lower end opening of the diffuser in the deployed state.

* * * * *